United States Patent
Zhang et al.

(10) Patent No.: US 9,409,537 B2
(45) Date of Patent: Aug. 9, 2016

(54) SEAT BELT SYSTEM

(71) Applicant: TRW Vehicle Safety Systems Inc., Washington, MI (US)

(72) Inventors: Songwei Zhang, Troy, MI (US); Bob L. McFalls, Shelby Township, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 0 days.

(21) Appl. No.: 14/369,323

(22) PCT Filed: Mar. 14, 2014

(86) PCT No.: PCT/US2014/027012
§ 371 (c)(1),
(2) Date: Jun. 27, 2014

(87) PCT Pub. No.: WO2014/152152
PCT Pub. Date: Sep. 25, 2014

(65) Prior Publication Data
US 2015/0367800 A1      Dec. 24, 2015

Related U.S. Application Data

(63) Continuation of application No. 13/236,757, filed on Sep. 20, 2011, now Pat. No. 8,793,844.

(60) Provisional application No. 61/793,253, filed on Mar. 15, 2013, provisional application No. 61/384,448, filed on Sep. 20, 2010.

(51) Int. Cl.
*B60R 22/185*      (2006.01)
*B60R 21/18*       (2006.01)
(Continued)

(52) U.S. Cl.
CPC ............. *B60R 21/18* (2013.01); *A44B 11/2561* (2013.01); *B60R 22/24* (2013.01); *B60R 22/28* (2013.01); *B60R 22/185* (2013.01); *B60R 2022/1812* (2013.01); *B60R 2022/282* (2013.01)

(58) Field of Classification Search
CPC ................. B60R 22/18; B60R 22/195; B60R 2022/1812; B60R 22/185
See application file for complete search history.

(56) References Cited

U.S. PATENT DOCUMENTS 3,791,670 A  *  2/1974 Lucore ................. B60R 21/18
                                                     280/733
4,023,826 A  *  5/1977 Kokubo ............. A44B 11/2561
                                                     24/163 R (Continued)

FOREIGN PATENT DOCUMENTS

DE     102010023872 A1  * 12/2011  ........... B60R 21/18
DE     102011109616 A1  *  2/2013  ........... B60R 21/18

*Primary Examiner* — James English
(74) *Attorney, Agent, or Firm* — Tarolli, Sundheim, Covell & Tummino LLP

(57) ABSTRACT

A seat belt system for restraining movement of an occupant of a vehicle includes a seat belt and a member having an opening through which the seat belt extends. A first inflatable portion of the seat belt extends in a first direction from the member. A second inflatable portion of the seat belt extends in a second direction from the member. A source of inflation fluid is connected in fluid communication with one of the first and second inflatable portions of the seat belt and connected in fluid communication with another of the first and second inflatable portions of the seat belt through the member. The one inflatable portion of the seat belt enables inflation fluid to flow from the source of inflation fluid into the one inflatable portion of the seat belt and to flow from the one inflatable portion of the seat belt through the member into the another inflatable portion of the seat belt.

16 Claims, 15 Drawing Sheets

(51) Int. Cl.
*A44B 11/25* (2006.01)
*B60R 22/24* (2006.01)
*B60R 22/28* (2006.01)
*B60R 22/18* (2006.01)

(56) References Cited

U.S. PATENT DOCUMENTS

| | | | |
|---|---|---|---|
| 4,167,054 A * | 9/1979 | Yamada | A44B 11/10 24/171 |
| 4,551,889 A | 11/1985 | Narayan et al. | |
| 5,100,176 A | 3/1992 | Ball et al. | |
| 5,138,749 A | 8/1992 | McCune et al. | |
| 5,222,278 A | 6/1993 | Ball et al. | |
| 5,806,148 A | 9/1998 | McFalls et al. | |
| 5,870,816 A | 2/1999 | McFalls et al. | |
| 6,279,945 B1 * | 8/2001 | Schneider | B60R 21/18 280/733 |
| 6,390,562 B1 | 5/2002 | Takamizu et al. | |
| 7,010,836 B2 | 3/2006 | Acton et al. | |
| 7,185,919 B2 | 3/2007 | Mather et al. | |
| 7,325,280 B2 | 2/2008 | Ichida | |
| 7,404,239 B1 | 7/2008 | Walton et al. | |
| 7,712,194 B2 | 5/2010 | Fyhr | |
| 2004/0158955 A1 | 8/2004 | Acton et al. | |
| 2004/0164532 A1 * | 8/2004 | Heidorn | B60R 21/201 280/733 |
| 2012/0068520 A1 * | 3/2012 | McFalls | A44B 11/2553 297/468 |
| 2013/0313811 A1 * | 11/2013 | Ichida | B60R 21/18 280/733 |

\* cited by examiner

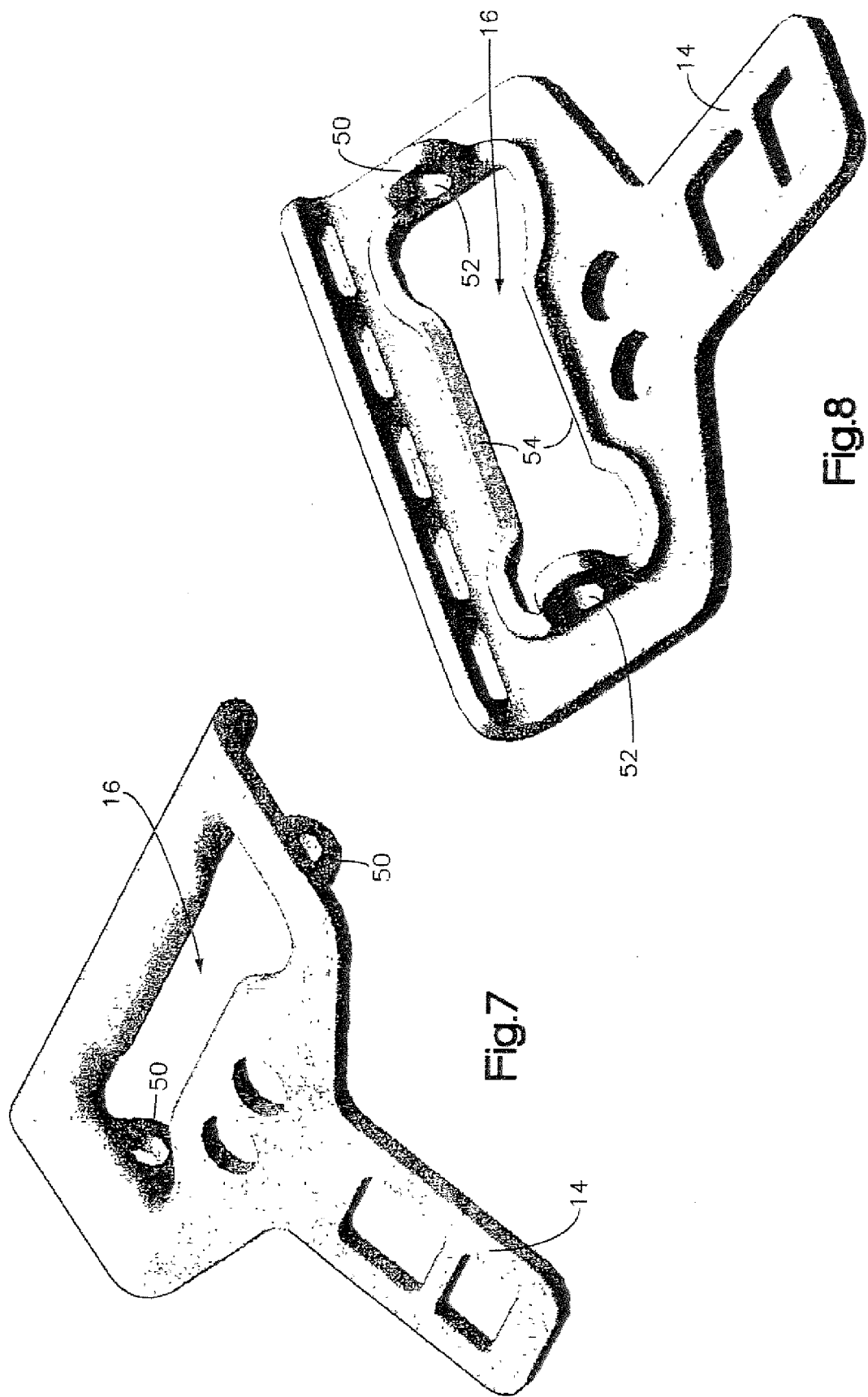

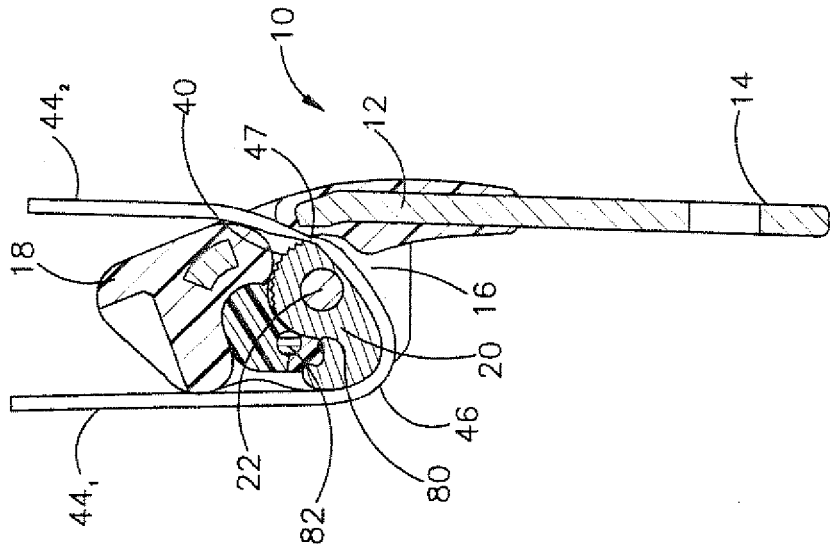
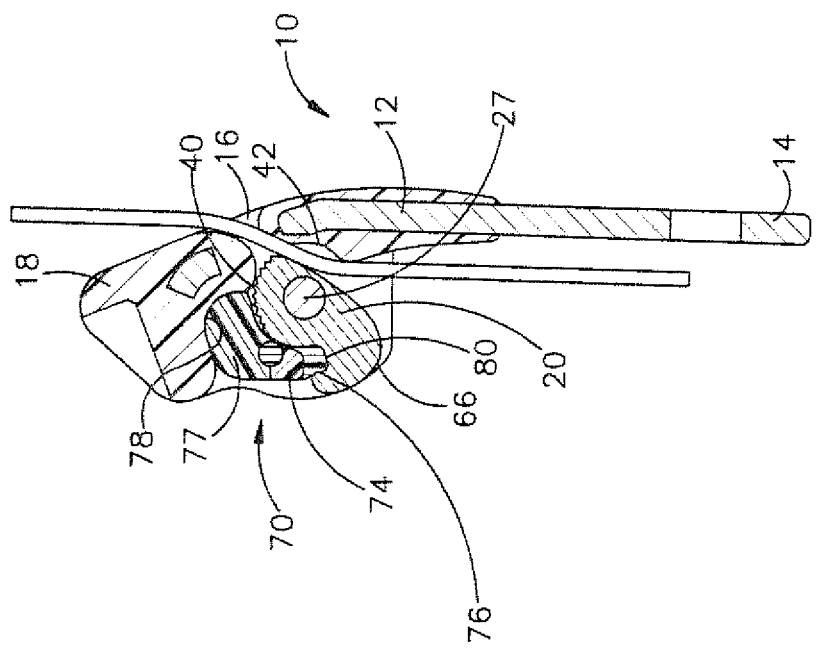

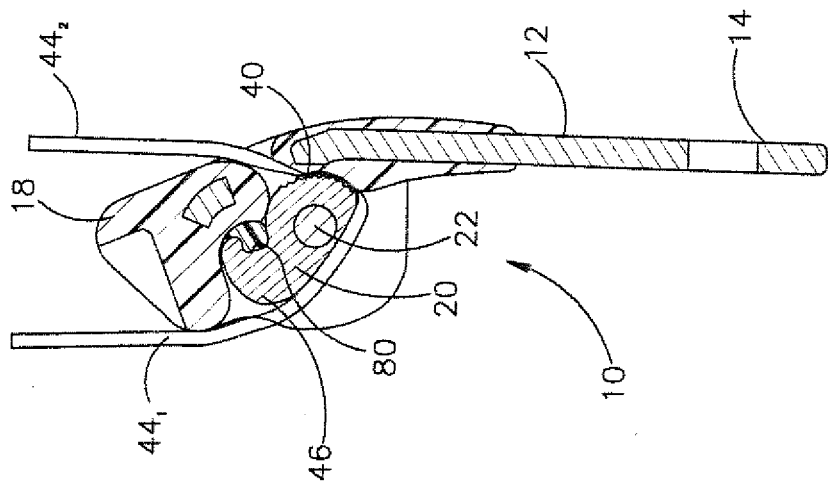
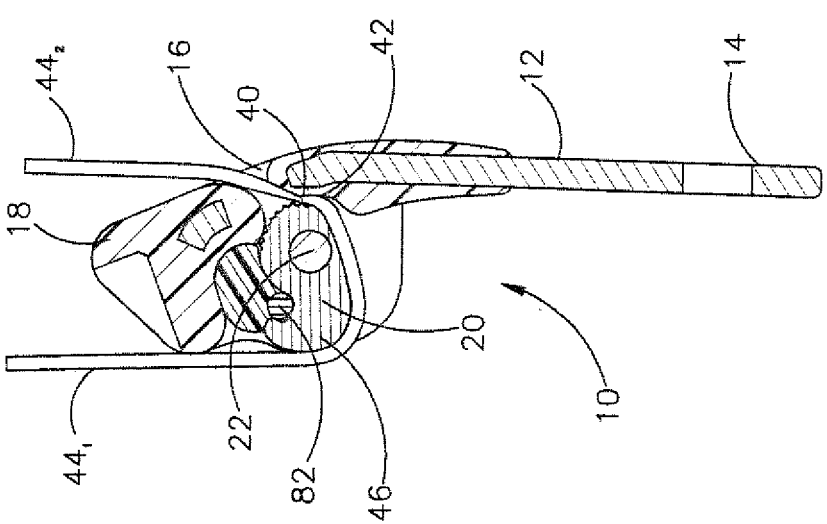

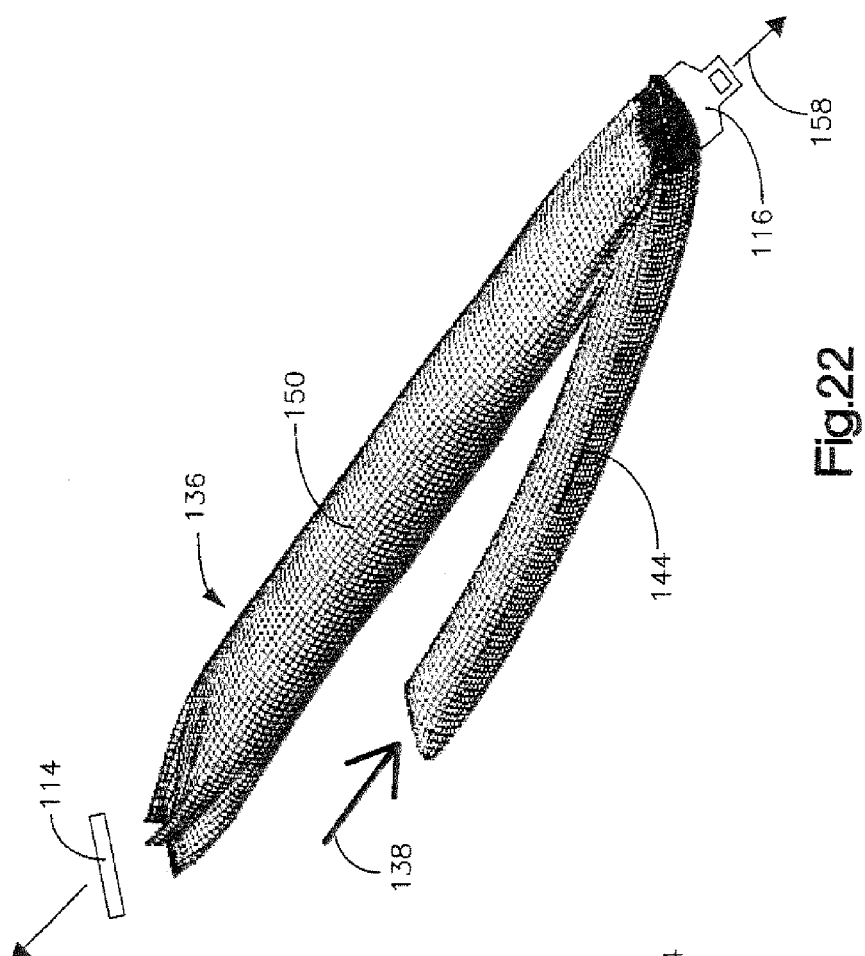
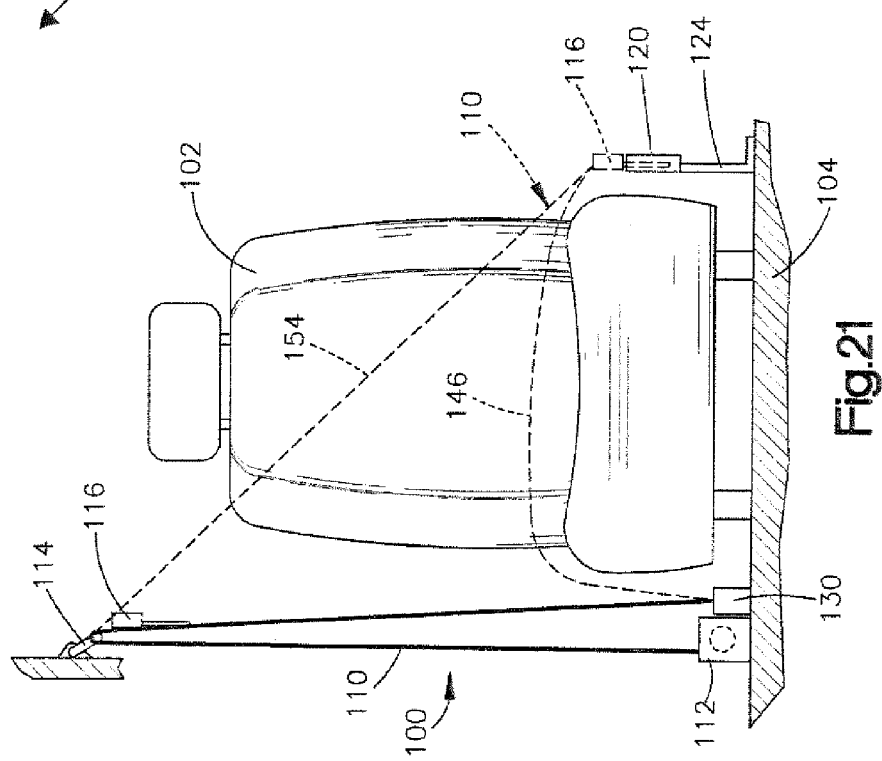

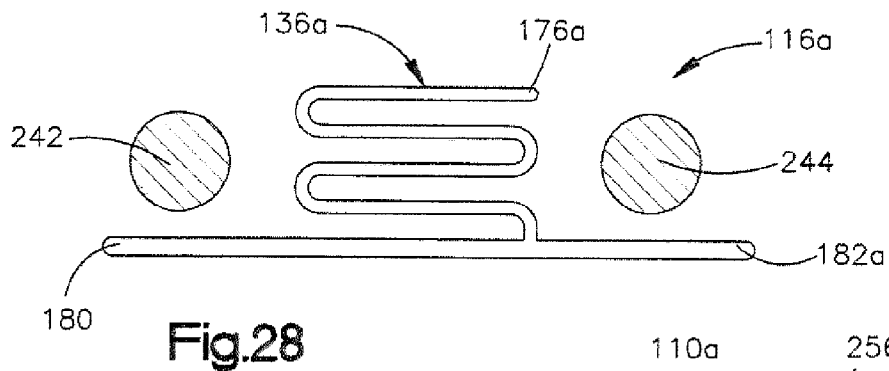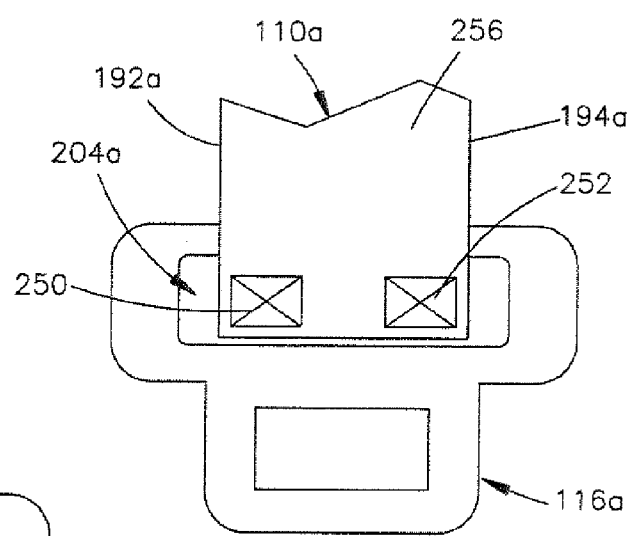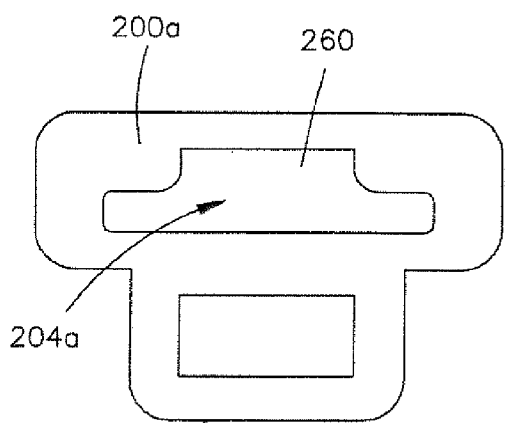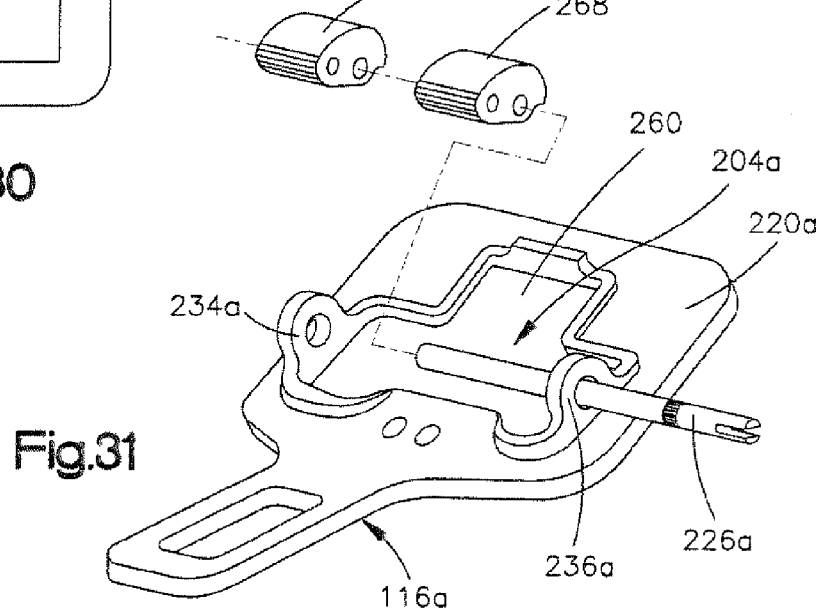

SEAT BELT SYSTEM

RELATED APPLICATIONS

This application corresponds to PCT/US2014/027012, filed Mar. 14, 2014, which claims the benefit of U.S. Provisional Application Ser. No. 61/793,253 filed Mar. 15, 2013 and is a Continuation-in-Part of U.S. patent application Ser. No. 13/236,757 filed Sep. 20, 2011, which claims the benefit of U.S. Provisional Application Ser. No. 61/384,448, filed Sep. 20, 2010. The subject matter, of which are incorporated herein by reference in their entirety.

TECHNICAL FIELD

The invention relates to a seat belt system having an inflatable seat belt and, more specifically, to a locking tongue and D-ring for a seat belt system having an inflatable seat belt.

BACKGROUND OF THE INVENTION

A locking tongue after this type is known from U.S. Pat. No. 5,806,148. The locking cam of U.S. Pat. No. 5,806,148 is arranged such that the belt webbing can pass freely through the webbing slot when the locking cam assumes its rest position. When the seat belt is being used by a vehicle occupant, he or she inserts the locking tongue into a seat belt buckle associated with the respective seat. Under the assumption that the seat belt is part of a conventional three point safety belt system, the locking tongue divides the seat belt into a torso portion and a lap portion. In a case in which the seat belt restrains the vehicle occupant, the load acting in the belt webbing acts on the locking cam so as to pivot the locking cam towards the clamping position. In the clamping position, the locking cam prevents or at least significantly reduces any slipping of the belt webbing through the webbing slot. This reduces the forward movement of the pelvis region of the vehicle occupant.

SUMMARY OF THE INVENTION

The object of the invention is to improve the known locking tongue with respect to the handling of the locking tongue in a non-buckled condition. The present invention provides a locking tongue, in which a biasing means is provided which biases the locking cam towards the rest position. The biasing means ensures that the locking cam cannot unintentionally clamp the belt webbing in the webbing slot, for example when the vehicle occupant unfastens the seat belt.

According to one embodiment of the invention, the biasing means is a spring. This results in a very compact configuration.

Preferably, the biasing means is formed by a torsion spring. The torsion spring can be arranged in close proximity to the locking cam and imparts a rotational biasing force.

According to an alternative embodiment, the biasing means is an elastomeric spring. An elastomeric spring is advantageous as it can be mounted in a very simple manner.

Preferably, the elastomeric spring is formed with at least two distinct compression segments. This allows different clamping positions which are assumed by the locking cam depending on the particular level of load which acts in the belt webbing.

According to an embodiment of the invention, a shear pin is provided which can be sheared off by the locking cam. The shear pin defines a locking position of the locking cam which is not assumed during normal operation. If the force acting in the belt webbing is high enough for shearing off the shear pin, the locking cam moves into a locking position.

According to an embodiment, the locking cam is mounted pivotably on a pivot stud, the pivot stud being connected to the base part by means of a plastics overmould fixed to the base part. This embodiment allows integrating the mounting portions for pivotably supporting the locking cam into the plastics overmould which is typically provided on the base part.

According to an alternative embodiment, the locking cam is mounted pivotably on a pivot stud, the pivot stud being held in bearing portions formed integrally with the base part. In this embodiment, the clamping loads acting on the locking cam are directly transferred into the base part so that the plastics overmould must not be designed in view of the clamping forces.

The invention also provides a combination of a locking tongue as described above and a seat belt, the seat belt extending through the webbing slot, an edge of the webbing slot acting as a clamping edge against which the belt webbing can be pressed by the locking cam. The dimensions of the webbing slot, the locking cam and the belt webbing are adjusted such that the locking cam can assume at least three positions. The locking cam has a rest position in which the belt webbing can pass freely through the webbing slot. The locking cam has at least one clamping position in which the locking cam presses the belt webbing against the clamping edge of the webbing slot such that the belt webbing is tightly clamped. The biasing means is able to return the locking cam from the clamping position into the rest position. The locking cam has a locking position in which the locking cam locks the belt webbing in the webbing slot. The biasing means is not able to return the locking cam from the locking position towards the rest position. The locking position is assumed by the locking cam in case of very high loads acting on the belt webbing. Once such high loads have occurred, the components of the seat belt system should be replaced. The locking cam remaining in the locking position provides a clear indication to the vehicle occupant that a repair is now necessary as the locking tongue is now held stationary on the belt webbing, preventing a belt retractor from taking up the belt webbing of the unfastened seat belt.

A shear pin may define the clamping position. The shear pin ensures that the locking cam is held in the clamping position up to a certain level of load. If the loads acting in the belt webbing exceed a certain threshold, the shear pin will be sheared off or give way, and the locking cam can reach the locking position.

According to another alternative embodiment, a seat belt system for restraining movement of an occupant of a vehicle includes a seat belt and a member having an opening through which the seat belt extends. A first inflatable portion of the seat belt extends in a first direction from the member. A second inflatable portion of the seat belt extends in a second direction from the member. A source of inflation fluid is connected in fluid communication with one of the first and second inflatable portions of the seat belt and connected in fluid communication with another of the first and second inflatable portions of the seat belt through the member. The one inflatable portion of the seat belt enables inflation fluid to flow from the source of inflation fluid into the one inflatable portion of the seat belt and to flow from the one inflatable portion of the seat belt through the member into the another inflatable portion of the seat belt.

BRIEF DESCRIPTION OF THE DRAWINGS

The invention will now be described with reference to different embodiments which are shown in the drawings. In the drawings:

FIG. 7 shows in a first perspective view of a base part for a locking tongue according to a second embodiment, FIG. 8 shows the base part of FIG. 7 in a second perspective view, FIG. 12 shows a cross section of the locking tongue according to the third embodiment, with the locking cam being in the rest position, FIG. 13 shows the locking tongue of FIG. 12 with the locking cam in a first clamping position, FIG. 14 shows the locking tongue of FIG. 12 with the locking cam in a second clamping position, FIG. 15 shows the locking tongue of FIG. 12 with the locking cam in a locking position, FIG. 21 shows a schematic illustration depicting the manner in which a seat belt system constructed in accordance with the present invention is utilized with a seat of a vehicle, FIG. 22 is a simplified schematic pictorial illustration of a bladder or airbag which forms a portion of a seat belt utilized in FIG. 21 in association with a vehicle seat, FIG. 28 is a schematized illustration depicting the manner in which an inflatable airbag constructed in accordance with FIG. 22 and utilized in a seat belt with a tongue constructed in accordance with the present invention is clamped by the tongue, FIG. 29 is a schematic illustration further depicting the relationship between the tongue of FIG. 28 and an inflatable seat belt, FIG. 30 is a schematic illustration further illustrating the construction of the tongue of FIG. 29, FIG. 31 is a partially exploded schematic illustration further depicting the construction of the tongue of FIGS. 28-30.

DESCRIPTION OF EXEMPLARY EMBODIMENTS

Figure 1:
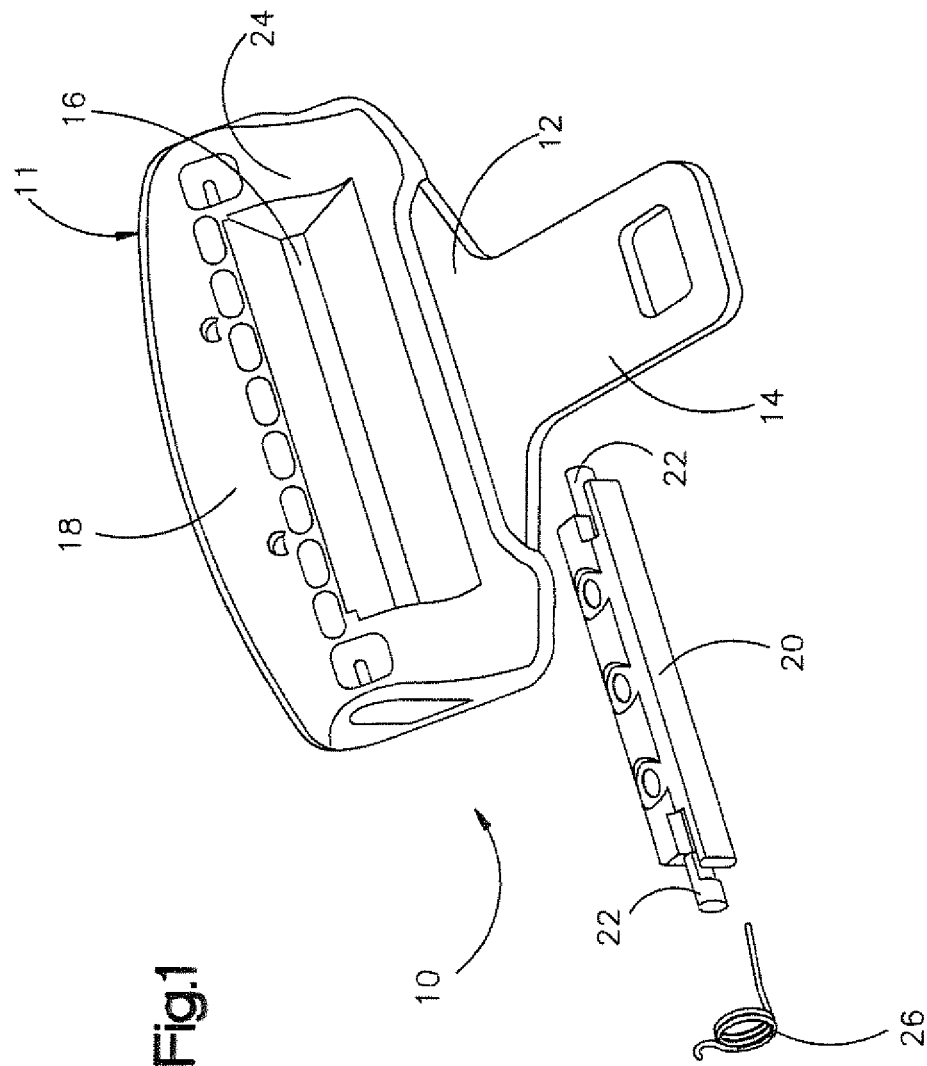
FIG. 1 shows a perspective, exploded view of a locking tongue according to a first embodiment.
Figure 2:
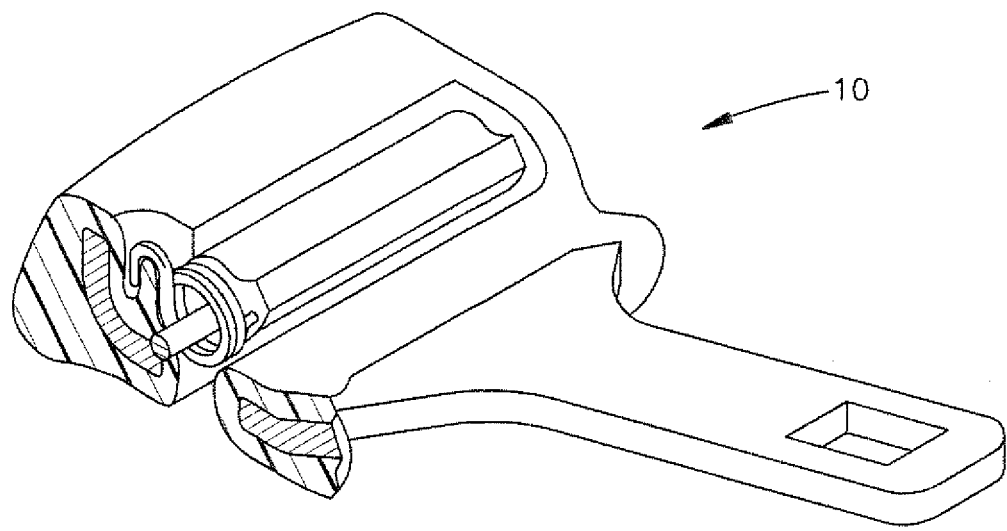
FIG. 2 shows a perspective, partially cut view of the locking tongue shown in FIG. 1.

In FIGS. 1 to 6, a locking tongue 10 according to a first embodiment is shown. Locking tongue 10 is part of a safety belt system for a vehicle and is intended for being inserted into a seat belt buckle (not shown).

Locking tongue 10 comprises a base 11 having a base part 12 typically made from metal, with base part 12 having an insert portion 14 which can be locked in the seat belt buckle. Base part 12 further comprises a webbing slot 16 through which the belt webbing 44 (please see FIG. 4) extends. Webbing slot 16 is formed as a cut-out in base part 12.

A cover 18 is provided on base part 12, the cover 18 being formed as a plastic part directly molded onto and partially over base part 12. As it can be seen in particular in FIGS. 2 and 3, cover 18 covers the edges of the cut-out provided in base part 12 for forming webbing slot 16. The slot defined by the surfaces of cover 18 is generally rectangular and extends through locking tongue 10 in a direction which extends at an angle α of approximately 45 degrees with respect to a plane in which locking portion 14 extends (please see FIG. 4).

Figure 3:
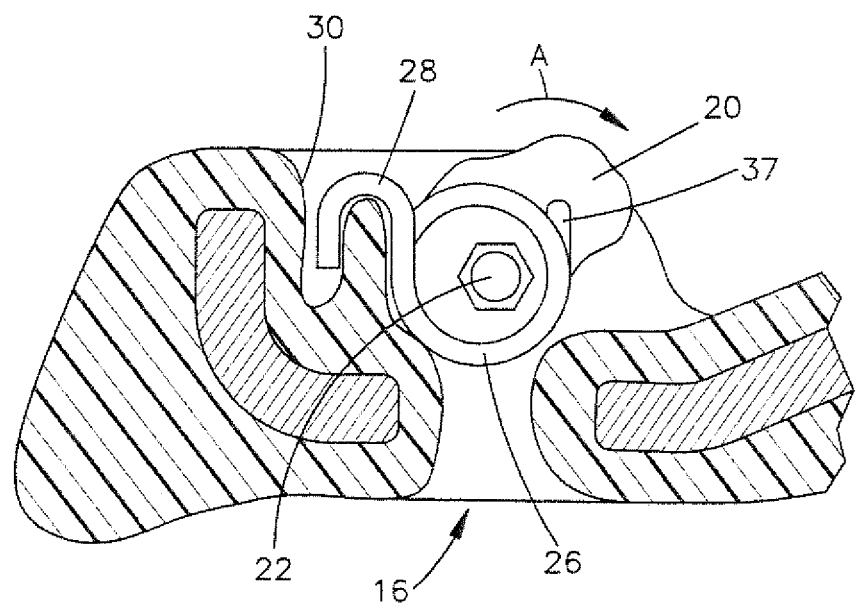
FIG. 3 shows at an enlarged scale a detail of FIG. 2.
Figure 6:
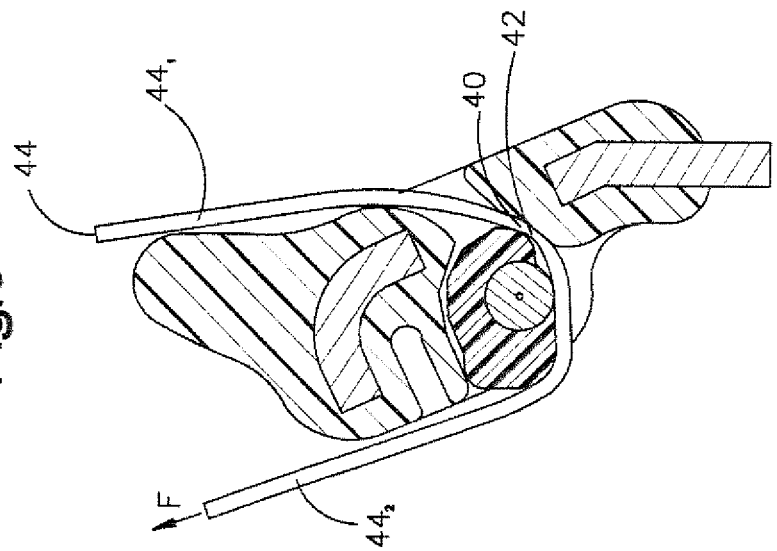
FIG. 6 shows the locking tongue of FIG. 4 with the locking cam in a clamping position.

A locking cam 20 is mounted pivotably on cover 18 of locking tongue 10, with the pivot axis of locking cam 20 being parallel to the longitudinal direction of webbing slot 16. Locking cam 20 is held by two pivot studs 22 which engage into bearing openings 24 formed in cover 18 close to the outer ends of webbing slot 16. A biasing means formed as a spring 26 is provided, which with one end leg 28 engages into a support opening 30 in cover 18 and with its other end leg 32 engages into locking cam 20. With reference to FIG. 3, spring 26 biases locking cam 20 in the direction of arrow A into the position shown in FIG. 3. It is contemplated that any desired spring may be used to bias the locking cam 20 in the direction of arrow A, such as a helical or leaf spring.

Figure 4:
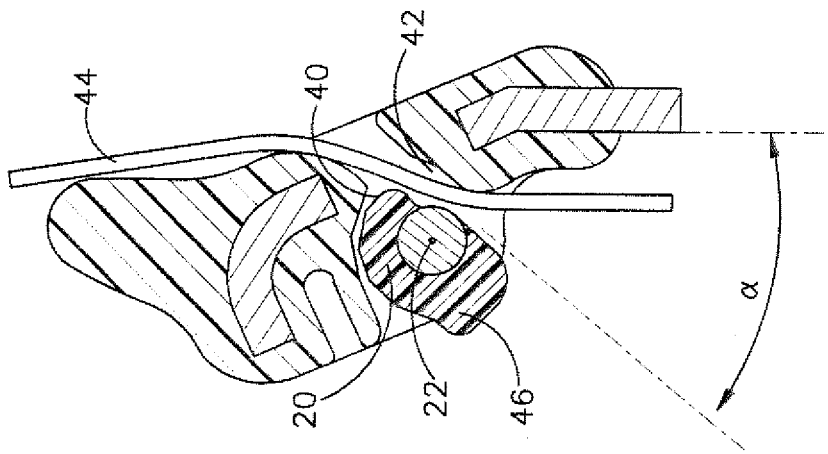
FIG. 4 shows the locking tongue according to the first embodiment with the locking cam in a rest position.
Figure 9:
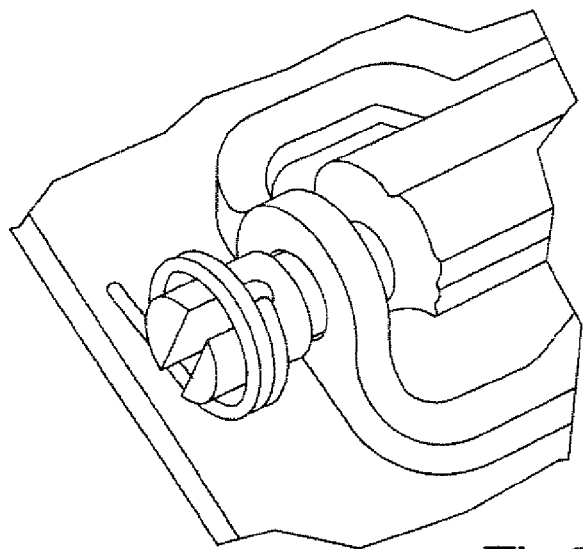
FIG. 9 shows a detail of the second embodiment.
Figure 10:
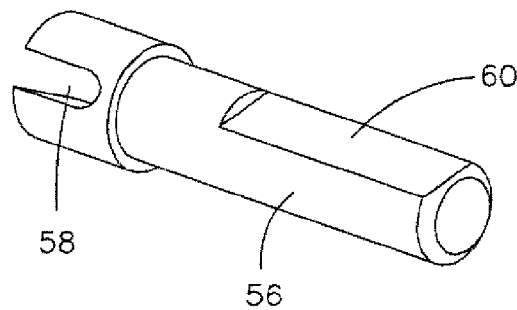
FIG. 10 shows a bearing pin used with the second embodiment.
Figure 11:
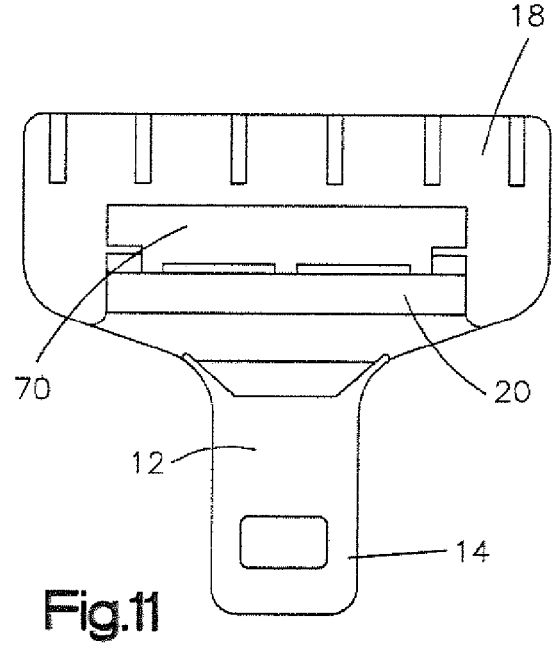
FIG. 11 shows a side view of a locking tongue according to a third embodiment.

As can be seen in greater detail in FIG. 4, locking cam 20 is provided with a locking portion 40 which, in the rest position shown in FIG. 4, is arranged at one side of webbing slot 16 spaced from a clamping edge 42 formed opposite locking portion 40 on cover 18. With locking cam 20 in the rest position, the belt webbing can pass freely through webbing slot 16 so that locking tongue 10 can be displaced along the belt webbing 44.

Locking cam 20 further is provided with a pressing portion 46 which is arranged approximately opposite locking portion 40 when taking the pivot axis defined by the centre line of pivot studs 22 of locking cam 20 as a reference. The maximum distance of pressing portion 46 from the pivot axis of locking cam 20 is larger than the maximum distance of locking portion 40 therefrom.

When the seat belt is fastened and the locking tongue 10 is engaged into a seat belt buckle, belt webbing 44 extends in a U-shape along cover 18 through webbing slot 16 and back along the cover. The locking tongue then divides the seat belt into two portions, namely a first portion $44_1$ and a second portion $44_2$, with the first portion typically being a torso portion and the second portion typically being a lap portion.

Figure 5:
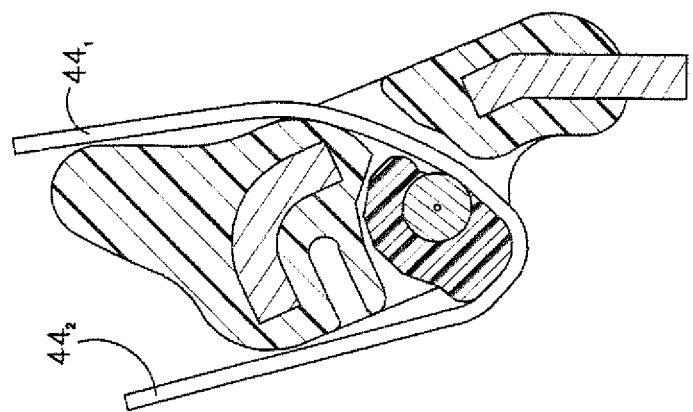
FIG. 5 shows the locking tongue of FIG. 4 with a locking cam in an intermediate position.

When the belt webbing extends around locking cam 20, it contacts pressing portion 46 (please see FIG. 5). If a high load is exerted on the belt webbing in this condition, in particular on portion $44_2$ of the seat belt in the direction of arrow F in FIG. 6, the frictional engagement between the belt webbing and pressing portion 46 in combination with the lever arm of pressing portion 46 results in locking cam 20 being pivoted against the action of spring 26 into the clamping position shown in FIG. 6. In the clamping position, clamping portion 40 clamps belt webbing 44 against clamping edge 42 of webbing slot 16 such that the belt webbing is either completely or at least largely prevented from slipping through webbing slot 16. It is contemplated that the locking cam 20 may permit a desired amount of slippage of the webbing relative to the locking tongue 10 when the locking cam is in the clamping position. This reduces a forward displacement of the pelvis region of the vehicle occupant using the seat belt, or improves the restraining effect provided for a child seat.

When the locking tongue is disengaged from the belt buckle such that the belt retractor can roll up the belt webbing, spring 26 returns locking cam 20 into the rest position shown in FIGS. 3 and 4 such that locking tongue 10 can freely slide on the belt webbing without there being a risk of an unintentional engagement of locking cam 20.

In FIGS. 7 to 10, the base part 12 of the base 11 for a locking tongue according to a second embodiment is shown. The difference between the first and the second embodiment is that in the second embodiment, base part 12 is provided with bearing portions 50 which are formed integrally with base part 12. In particular, bearing portions 50 are formed as stamped lugs at the edge of the cut-out forming webbing slot 16, and are bent by approximately 90° upwardly. Each bearing portion 50 comprises a bearing opening 24 which accommodates the bearing studs of locking cam 20.

In order to increase the stiffness of the locking tongue, flanges 54 are formed on the opposing longer edges of the cut-out forming webbing slot 16. This in particular increases the stiffness in the region against which the belt webbing is pressed when locking cam 20 is in the clamping position.

For pivotably supporting locking cam 20 in bearing portions 50, short studs 56 are used which each feature a slot 58 at the end where spring 26 is arranged. The end of stud 56 which engages into locking cam 20 is provided with a flattened portion 60, which allows to transmit the torque from the spring towards the locking cam and which further guarantees that slot 58 is maintained in the same orientation on both sides of the locking cam, so that the end leg of the spring engaging into slot 58 are maintained in the same angular position.

A third embodiment of locking tongue 10 is shown in FIGS. 11 to 15. The difference between the third embodiment and the previous embodiments is that in the third embodiment, an elastomeric spring 70 is used as biasing means for urging locking cam 20 into the rest position shown in FIG. 12.

Spring 70 is here formed from three segments 72, 74 and 76 which are arranged in a row between a concave support portion 78 formed on cover 18 and a likewise concave abutment portion 80 formed on pressing portion 46 of locking cam 20.

The biasing force provided by spring segment 76 is lower than the biasing force provided by spring segment 74, with the segment 76 being the one which abuts on locking cam 20. The spring segment 72 engages the concave support portion 78 on the cover 18.

Furthermore, a shear pin 82 is provided such that it can cooperate with abutment portion 80 of locking cam 20. As can be seen in FIG. 12, shear pin 82 is arranged between the first and the second segments 72, 74 of spring 70. Spring 70 holds locking cam 20 in the rest position shown in FIG. 12 such that the belt webbing can pass freely through webbing slot 16.

When the seat belt is fastened such that the belt webbing runs in a U-shape through webbing slot 16 and around locking cam 20, a certain level of load acting in the seat belt portion $44_1$ results in locking cam 20 being pivoted into a first clamping position which is shown in FIG. 13. When locking cam 20 is being pivoted into the first clamping position, the third segment 76 of spring 70 is compressed. In the first clamping position, clamping portion 40 of locking cam 20 presses the belt webbing against clamping edge 42 of cover 18 such that any slipping of the belt webbing through webbing slot 16 is prevented up to a certain level.

When the loads acting on the belt webbing reach a higher level, locking cam 20 is rotated beyond the first clamping position into the second clamping position shown in FIG. 14. In the second clamping position, the second segment 74 of spring 70 is compressed, resulting in concave portion 80 of locking cam 20 abutting shear pin 82. In the second clamping position, the belt webbing is clamped with higher clamping forces as compared to the first clamping position, resulting in higher forces being necessary for pulling the belt webbing through webbing slot 16.

In both the first and the second clamping positions shown in FIGS. 13 and 14, spring 70 is capable of returning locking cam 20 into the rest position when the seat belt is unfastened and the portion $44_1$ of the seat belt ceases to act on pressing portion 46 of locking cam 20.

When even higher forces act in the seat belt than in a condition which makes locking cam 20 assume the second clamping position, shear pin 82 is sheared off, and locking cam 20 is brought into a third locking position which is shown in FIG. 15. In the third locking position, spring 70 is almost completely compressed, and locking portion 40 tightly locks the belt webbing against clamping edge 42 of locking tongue 10. If the locking position shown in FIG. 15 is reached, spring 70 is not capable of returning locking cam 20 towards the rest position, resulting in the belt webbing being locked in this particular position at locking tongue 10. This is a clear indication for a vehicle occupant that the components of the seat belt system require replacement.

A locking tongue 10 according to a fourth embodiment is shown in FIGS. 16-19. The locking tongue 10 includes a base 11 having a base part 12 with an insert portion 14 that engages a seat belt buckle. The base part 12 includes a webbing slot 16 through which the belt webbing extends.

A cover 18 is directly molded onto and partially over base part 12. The cover 18 covers the edges of the slot 16 in base part 12. A locking cam 20 is mounted pivotably on cover 18 of locking tongue 10 by a pivot shaft 22. The locking cam 20 may be made of one-piece or a plurality of pieces connected together. The locking cam 20 may be formed of aluminum, steel, plastic, magnesium or any other desired material or combinations of material. The pivot shaft 22 extends through an opening 23 in the locking cam 20. A pivot axis of the locking cam 20 and the pivot shaft 22 extends parallel to the longitudinal direction of webbing slot 16.

The pivot shaft 22 extends into openings in flanges 24 of the base part 12. The flanges 24 extend from opposite sides of the webbing slot 16. Opposite ends of the pivot shaft 22 extend into openings in the cover to help retain the pivot shaft in the flanges 24. The flanges 24 support the pivot shaft 22 and the locking cam 20 for pivotal movement relative to the base part 12 and the cover 18.

The pivot shaft 22 includes a knurled surface 25 that prevents relative rotation between the pivot shaft 22 and the locking cam 20 and helps transfer torque between the locking cam 20 and the pivot shaft 22. The locking cam 20 may include a knurled surface that engages the knurled surface 25 on the pivot shaft 22. It is contemplated that the pivot shaft 22 and the locking cam 20 may be connected to each other in any desired manner. The pivot shaft 22 and the locking cam 20 may have mating splines or flat surfaces. It is also contemplated that the pivot shaft 22 may be press fit into the locking cam 20 or formed as one piece with the locking cam.

Figure 17:
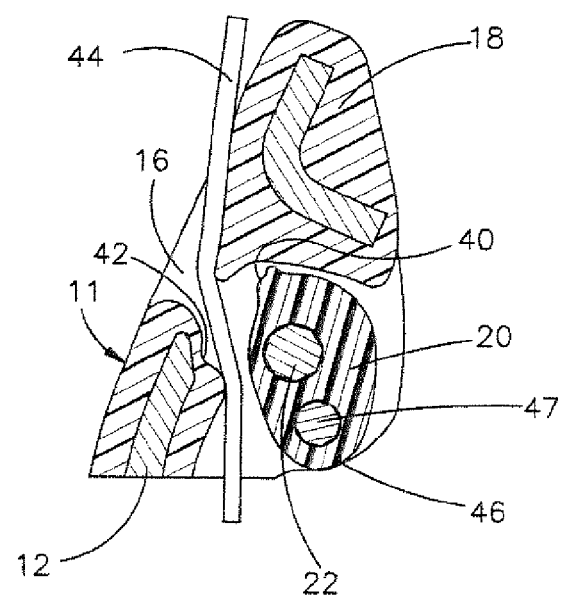
FIG. 17 shows a cross-sectional view of a portion of the locking tongue of FIG. 16 showing a locking cam in a rest position.
Figure 18:
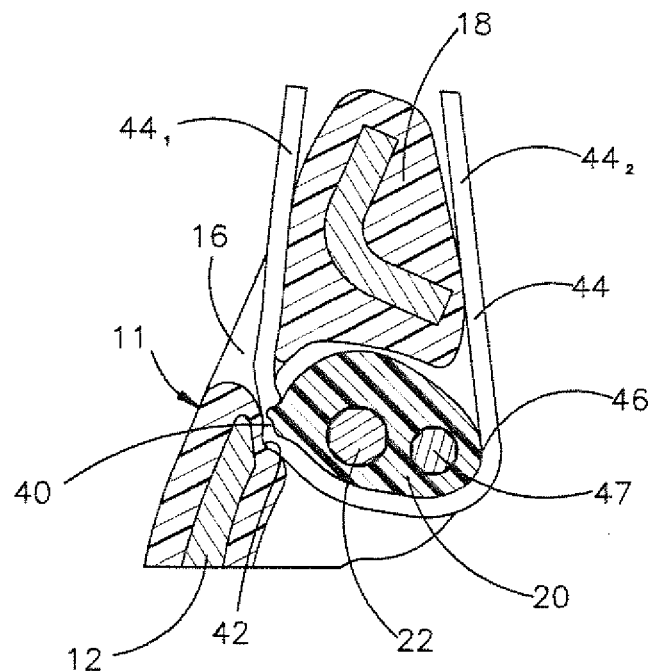
FIG. 18 shows a cross-sectional view of a portion of the locking tongue of FIG. 16 showing the locking cam in a clamping position.
Figure 19:
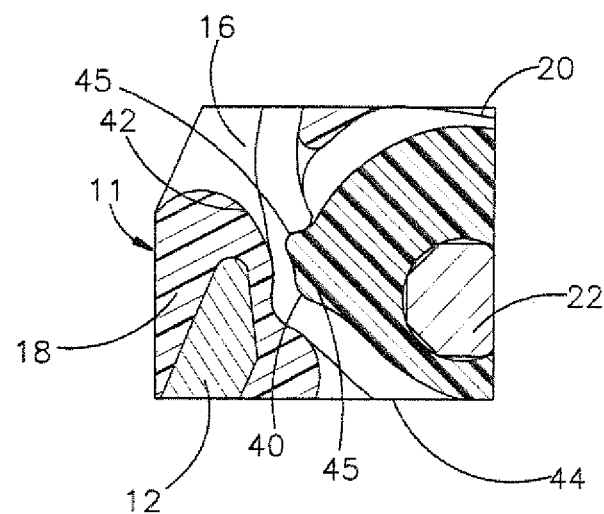
FIG. 19 shows an enlarged view of a portion of the locking cam of FIG. 18.

A biasing means, such as a spring 26 urges the locking cam into a rest position, shown in FIG. 17. The spring 26 has a first leg 28 that engages the cover 18. A second leg 32 of the spring 26 extends into a slot in an end of the pivot shaft 22. The legs of the pivot shaft 22 defining the slot may be bent to connect the second leg 32 to the pivot shaft. Accordingly, the second leg 32 of the spring 26 pivots with the pivot shaft 22 and the locking cam 20 relative to the base part 12 and the cover 18. It is contemplated that any desired spring may be used to bias the locking cam 20 toward the rest position and the spring may be connected to the locking cam 20 and/or the pivot shaft in any desired manner. A cap 34 may snap into the cover 18 to help protect the spring 26.

Figure 20:
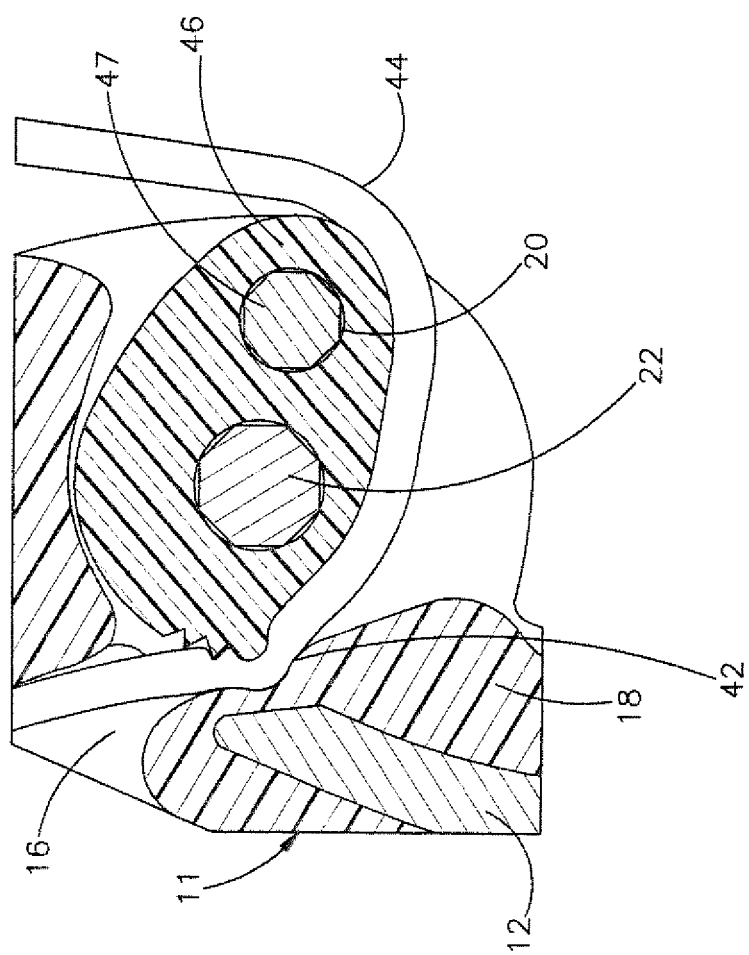
FIG. 20 shows an enlarged view of a portion of an another embodiment of a locking cam.

The locking cam 20 is provided with a locking portion 40 which, in the rest position shown in FIG. 17, is spaced from a clamping edge 42 formed on cover 18. With locking cam 20 in the rest position, the belt webbing can pass freely through webbing slot 16 so that locking tongue 10 can be displaced along the belt webbing 44. The locking portion 40 clamps the belt webbing 44 to the clamping edge 42 on the cover 18 when the locking cam is in the clamping position shown in FIGS. 18 and 19. The locking portion 40 may include ribs or teeth 45 that extend along the length of the locking cam 20. Although the locking portion 40 is shown as having two ribs 45, it is contemplated that the locking portion may have any desired number of ribs, including only one rib. It is also contemplated that the locking portion 40 may have a plurality of teeth, as shown in FIG. 20.

The ribs 45 or teeth may not extend the entire length of the locking cam 20. Also, the clamping edge 42 on the cover 18 may not extend the entire length of the slot. If the teeth or ribs 45 and/or the clamping edge 42 do not extend the entire length of the slot, the webbing 44 will not be clamped near the edges of the webbing when the locking cam 20 is in the clamping position.

The locking cam 20 includes a pressing portion 46. The pressing portion 46 is on an opposite side of the pivot axis from the locking portion 40. The pressing portion 46 extends from the pivot axis of locking cam 20 a greater distance than the locking portion. An opening 47 may extend through the pressing portion 46 to help reduce the weight of the locking cam 20. It is contemplated that each end of the pressing portion 46 may have an opening extending into the pressing portion instead of a single opening extending through the pressing portion.

When the seat belt is fastened and the locking tongue 10 is engaged into a seat belt buckle, belt webbing 44 extends in a U-shape along cover 18 through webbing slot 16 and back along the cover. The locking tongue then divides the seat belt into two portions, namely a first portion $44_1$ and a second portion $44_2$, with the first portion typically being a torso portion and the second portion typically being a lap portion.

When the belt webbing extends around locking cam 20, it contacts pressing portion 46. If a high load is exerted on the belt webbing in this condition, in particular on portion $44_2$ of the seat belt, the frictional engagement between the belt webbing and pressing portion 46 in combination with the lever arm of pressing portion 46 results in locking cam 20 being pivoted against the action of spring 26 into the clamping position shown in FIGS. 18 and 19. In the clamping position, clamping portion 40 clamps belt webbing 44 against clamping edge 42 of the cover 18 such that the belt webbing is either completely or at least largely prevented from slipping through webbing slot 16. This prevents a forward displacement of the pelvis region of the vehicle occupant using the seat belt, or improves the restraining effect provided for a child seat.

When the locking tongue is disengaged from the belt buckle such that the belt retractor can roll up the belt webbing, spring 26 returns locking cam 20 into the rest position shown in FIG. 17 such that locking tongue 10 can freely slide on the belt webbing without there being a risk of locking cam 20 moving into the clamping position.

A seat belt system 100 constructed in accordance with the present invention is illustrated in FIG. 21 in association with a seat 102. The seat belt system 100 includes an inflatable seat belt 110 which is connected with a seat belt retractor 112 having a known construction. A D-ring member 114 is mounted on the vehicle 104 adjacent to the seat 102.

A tongue member 116 constructed in accordance with the present invention, is connected with the inflatable seat belt 110. The tongue 116 is movable from an inactive storage position illustrated in solid lines in FIG. 21 to an active position engaging a buckle 120. The tongue 116 may move relative to the seat belt 110 as the tongue moves between the inactive and active positions. The buckle 120 is connected to the vehicle adjacent to the seat 102 by a suitable connector 124. When the seat belt 110 is in the active position illustrated in dashed lines in FIG. 21 in engagement with a buckle 120, the seat belt is effective to restrain movement of an occupant of a seat 102 relative to the seat and the vehicle 104.

The seat belt 110 is inflatable. Therefore, a source 130 of inflation fluid is connected in fluid communication with the seat belt 110. When the seat belt 110 is to restrain movement of an occupant of the seat 102 in the vehicle 104, the source of inflation fluid 130 is activated to direct a flow of inflation fluid into the inflatable seat belt 110. The inflation fluid causes expansion of the seat belt 110.

The source 130 of inflation fluid may have any one of many known constructions. Thus, the source 130 of inflation fluid may be a gas generator. Alternatively, the source 130 of inflation fluid may be a container which stores inflation fluid under pressure.

The inflatable seat belt 110 has a known construction and includes a casing which encloses a bladder or airbag 136 (FIG. 22). The airbag 136 is enclosed by a flexible casing to form the inflatable seat belt 110. Upon inflation of the airbag 136 by inflation fluid 138 from the source 130 of inflation fluid, the exterior casing is ruptured and the airbag 136 is expanded to increase the area over which restraining forces are applied to an occupant of a vehicle seat 102. It should be understood that the seat belt 110 may be constructed without having a casing for the airbag 136. This would result in the airbag itself functioning as the seat belt 110.

The airbag 110 has a first or lap portion 144 which extends from the tongue member 116 across a lap of an occupant of a seat 102, in the manner indicated schematically in dashed lines at 146 in FIG. 21, when the tongue member is in engagement with the buckle 120. The lap portion 144 extends from the source 130 of inflation fluid to the tongue 116 engaging the buckle 120. At the same time, a second or chest portion 150 of the airbag extends from the tongue member 116 across the chest of an occupant of the seat 102, in the manner illustrated schematically in dashed lines at 154 in FIG. 21. The chest portion 150 extends from the tongue 116 connected to the buckle 120 to the D-ring member 114. It should be understood that, prior to being inflated, the airbag 136 may be enclosed in a known manner by a rupturable casing.

When the occupant of the seat 102 is to be restrained, the retractor 112 locks and prevents the withdrawal of any additional length of the inflatable seat belt 110 from the retractor 112. Contemporaneously therewith, the inflation fluid source 130 is activated to inflate the tubular airbag 136. At this time, the lap portion 136 of the airbag and, if desired, a portion of the casing for the airbag is tensioned between an anchor connected with a source of inflation fluid 130 and the tongue 116. The chest portion 150 of the airbag is tensioned between the tongue 116 and the D-ring 114. This enables the inflatable seat belt 110 to inflate and restrain the occupant of the seat 102 in a known manner.

Upon inflation of the airbag 136, inflation fluid 138 (FIG. 22) from the source 130 (FIG. 21) of inflation fluid flows into the first or lap portion 144 of the airbag 136. The inflation fluid flows from the lap portion 144 of the tubular airbag 136 through the tongue member 116 into the second or chest portion 150 of the airbag 136. In order to inflate the chest portion 150 of the airbag 136, in the manner illustrated schematically in FIG. 22, inflation fluid must flow from the lap portion 144 of the airbag 136 through the tongue 116 into the chest portion 150 of the airbag. This flow of inflation fluid will occur contemporaneously with loading of the seat belt 110 and airbag 136 by the occupant of the seat 102 as the occupant of the seat is restrained.

As the airbag 136 is inflated, force is transmitted between the tongue 116 and the lap portion 144 and chest portion 150 of the airbag 136. This force, indicated schematically at 158 in FIG. 22, tends to cause the airbag to pinch or be squeezed or compressed at the tongue 116. This pinching may substantially restrict flow of inflation fluid from the lap portion 144 to the chest portion 150 of the airbag 136 through the tongue.

Figure 23:
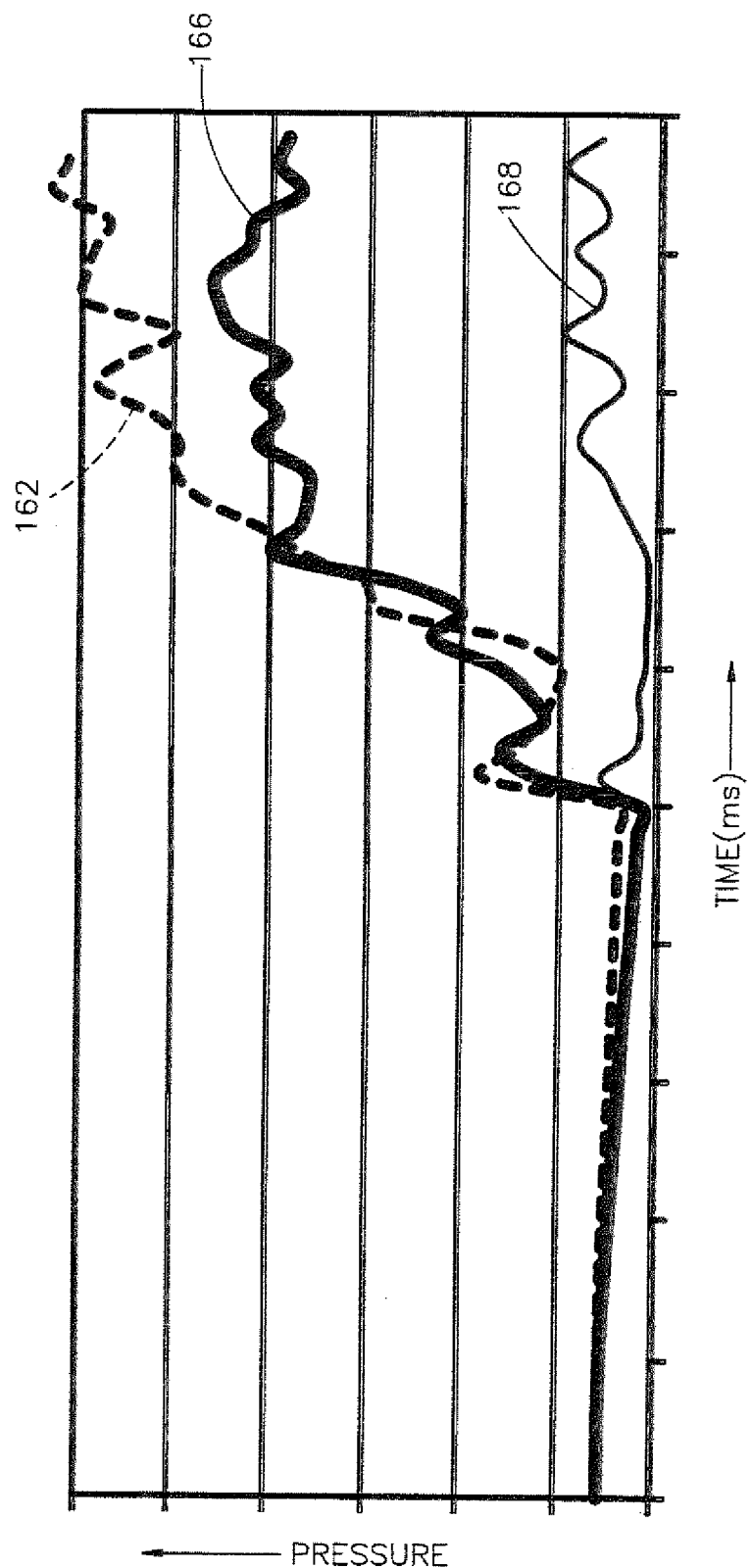
FIG. 23 is a graph illustrating the manner in which pressure in an airbag in an inflatable lap belt used with a known tongue varies with time, the manner in which pressure varies in an inflatable lap belt utilized with a tongue constructed in accordance with the present invention, and the manner in which fluid pressure varies in an inflatable chest belt utilized with the tongue constructed in accordance with the present invention.

A simulation of the manner in which air pressure varies with time in an airbag having an inflatable lap portion is indicated at 162 in FIG. 23. It should be noticed that the fluid pressure in the lap portion of this known airbag quickly rises to a relatively high level of pressure.

The manner in which the fluid pressure in the lap portion 144 and the chest portion 150 of the airbag 136 in the present invention changes with time is also indicated in FIG. 23. Thus, a curve 166 indicates the manner in which the fluid pressure in the lap portion 144 of the airbag 136 increases with a flow of inflation fluid 138 from the source 130. Contemporaneously therewith, the pressure in the chest portion 150 of the airbag 136 varies in the manner indicated schematically by the curve 168 in FIG. 23.

The tongue member 116, to some extent at least, restricts flow of inflation fluid from the lap portion 144 to the chest portion 150 in the airbag 136. Therefore, the fluid pressure in the lap portion 144 is greater than the fluid pressure in the chest portion 150. This is indicated schematically in FIG. 23 where the fluid pressure in the lap portion, indicated at 166 is substantially greater than the fluid pressure in the chest portion, indicated schematically at 168.

In accordance with one of the features of the embodiment of the invention illustrated in FIGS. 21-27, the tongue 116 is constructed so as to grip only a portion of the part of the airbag 136 which extends through the tongue. This results in the remaining portion of the airbag 136 which extends through the tongue member 116 being able to conduct a flow of inflation fluid from the first or lap portion 144 to the second or chest portion 150 of the airbag 136.

Figure 24:
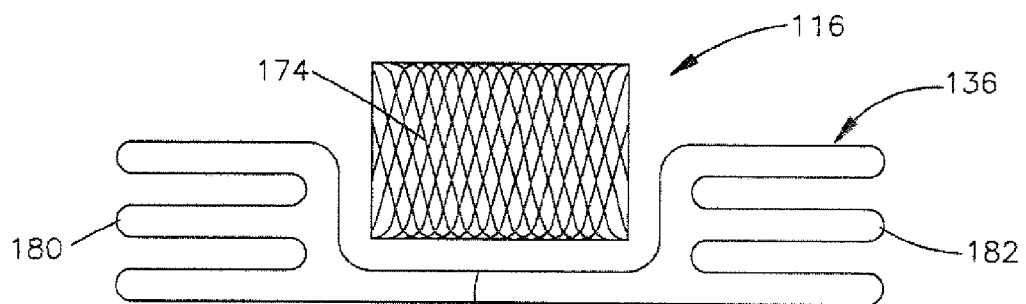
FIG. 24 is a schematized illustration depicting the manner in which an inflatable airbag constructed in accordance with FIG. 22 and utilized with a seat belt with a tongue constructed in accordance with the present invention is clamped by the tongue.

In the embodiment of the invention illustrated in FIG. 24, the tongue member 116 has a locking portion 174 (FIG. 24) which applies force against only a central portion 176 of the part of the airbag 136 which extends through the tongue 116. Longitudinally extending edge portions 180 and 182 of the airbag 136 are not clamped by the locking portion 174 of the tongue 116. The edge portions 180 and 182 are located on opposite sides of the central portion 176.

The locking portion 174 of the tongue 116 corresponds to the locking portion 40 of the tongues illustrated in FIGS. 4-6 and 12-20. However, the tongues illustrated in FIGS. 4-6 and 12-20 may be constructed so as to apply force across the width of the seat belt. Assuming that the tongues illustrated in FIGS. 4-6 and 12-20 are constructed so as to apply a clamping force across the width of a seat belt, if these tongues were used to clamp the inflatable seat belt 110, the flow of inflation fluid from the lap portion 144 (FIG. 22) to the chest portion 150 of the airbag 136 would be restricted by the clamping force. It should be understood that the tongues of FIGS. 4-6 and 12-20 may be constructed so as to apply a clamping force to only a portion of an airbag, such as the central portion 176 of the airbag 136 (FIG. 24).

Figure 25:
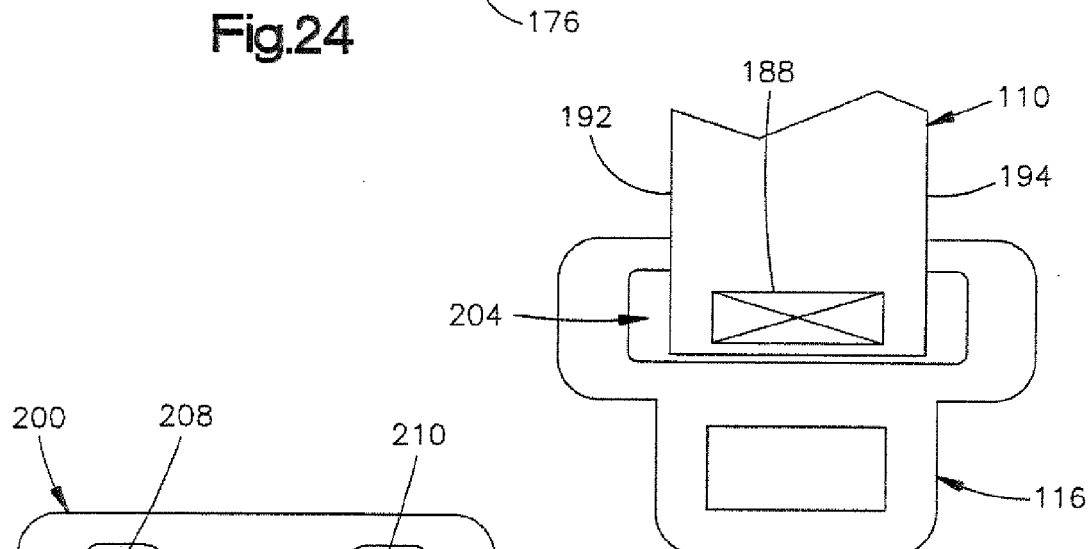
FIG. 25 is a schematic illustration depicting a relationship between the tongue of FIG. 24 and an inflatable seat belt.
Figure 26:
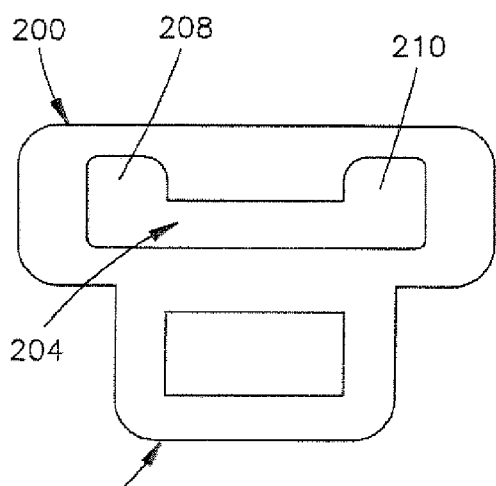
FIG. 26 is a schematic illustration further illustrating the construction of the tongue of FIG. 25.

The tongue member 116 is constructed so that the locking portion 174 applies force to only a central portion of the inflatable seat belt 110 in the manner indicated schematically at 188 in FIG. 25. The locking portion 174 (FIG. 24) applies force to a portion of the seat belt 110 disposed between opposite longitudinally extending edge portions 192 and 194 of the inflatable seat belt 110. Since the airbag 136 is contained within the inflatable seat belt 110 and is coextensive with the inflatable seat belt 110, the locking portion 174 does not apply a clamping force against the edge portions 180 and 182 of the airbag 136 which extend along the edges 192 and 194 of the inflatable seat belt 110.

When the occupant of the seat 102 is restrained by the inflatable seat belt 110, the occupant applies force to the seat belt which tends to pull the seat belt against the tongue and pinch off the portion of the seat belt which extends through the tongue. To minimize any tendency for the edge portions 180 and 182 of the airbag 136 to be pinched or clamped as a result of a pulling force transmitted through the seat belt 110 to the tongue 116, the tongue 116 includes a base part 200 (FIG. 26) corresponding to the base part of FIGS. 7 and 8, having an enlarged webbing slot or opening 204 which receives the inflatable seat belt 110 in the manner illustrated schematically in FIG. 25. The webbing slot 204 is enlarged or expanded to have recesses 208 and 210 (FIG. 26) which receive the edge portions 180 and 182 of the airbag 136 upon inflation of the seat belt 110. At this time, the locking portion 174 is effective to apply clamping force against the central portion 176 of the inflatable airbag 136 in the manner illustrated schematically at 188 in FIG. 25.

The tongue member 116, with the exception of the webbing slot or opening 204, has the same general construction as the tongues illustrated in FIGS. 4-6 and 12-20. The tongue 116 has a base part 220 (FIG. 27) corresponding to the base part 12 of FIG. 16. A cover (not shown) is molded onto and partially over the base part 220 in the same general manner as the cover 18 is molded onto and partially over the base part 12. The locking cam 224 is pivotally mounted on the base part and cover by a pivot shaft 226. The locking cam may be made of one-piece or a plurality of pieces connected together. The locking cam 224 may be formed of aluminum, steel, plastic, magnesium or any other desired material or combinations of materials. The pivot shaft 226 extends through an opening 230 in the locking cam 224. The pivot shaft 226 extends into openings in flanges 234 and 236 on the base part 220.

Figure 16:
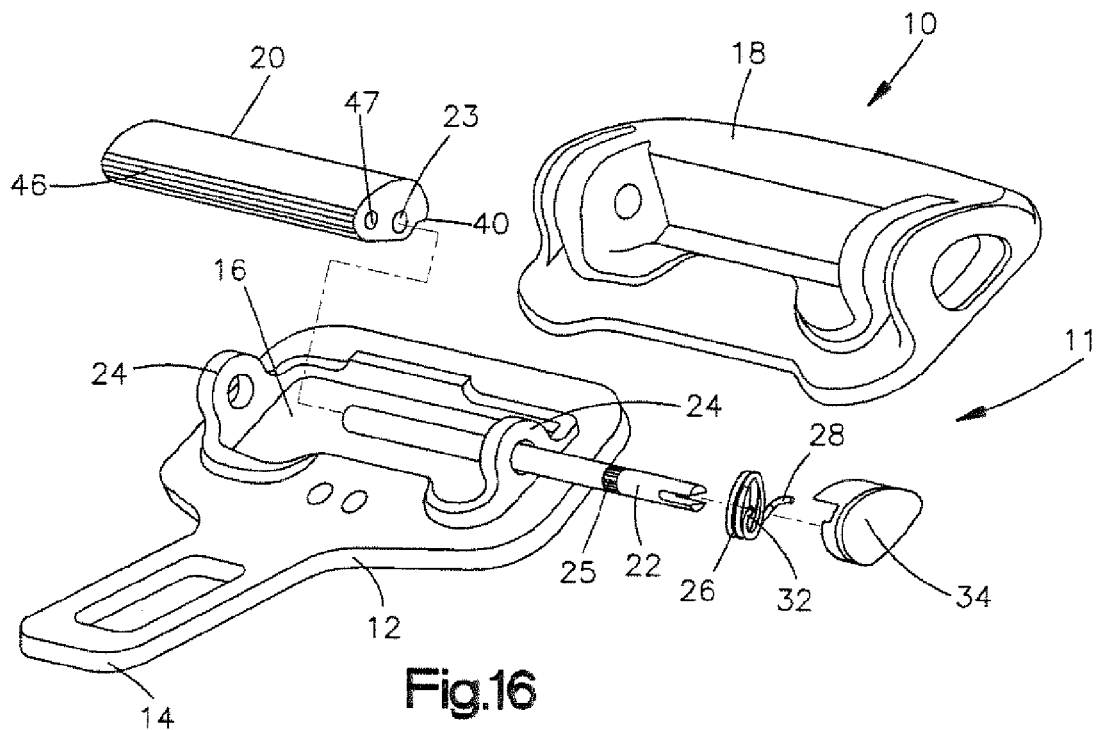
FIG. 16 shows a perspective, exploded view of a locking tongue according to a fourth embodiment.

Although the tongue 116 has the same general construction as the tongues 10 illustrated in FIG. 16, the locking cam 224 has an axial extent, that is an extent as measured along the longitudinal central axis of the cylindrical opening 230 and the pivot shaft 226, which is shorter than the length of the locking cam 20 of FIG. 16. This is because the locking cam 224 engages only the central portion of the seat belt 110 and does not engage the edge portions 192 and 194 of the seat belt. This results in the central portion 176 of the airbag being firmly clamped in the manner illustrated schematically in FIG. 24 while the edge portions 180 and 182 of the airbag 136 are not clamped.

The base part 220 of the tongue 116 and the cover which is molded over the base part 220 form the webbing slot 204 with relatively large recesses 208 and 210 into which the edge portions 180 and 182 of the airbag 136 (FIG. 24) can expand. The locking cam 224 will engage the central portion of the seat belt 110 and will be effective to clamp the central portion 176 of the airbag 136 in the manner illustrated schematically in FIG. 24. However, since the locking cam 224 has a relatively short length, compared to the locking cam 20 of FIG. 16, the locking cam 224 does not clamp the edge portions 180 and 182 of the airbag 136. This enables inflation fluid 138 (FIG. 22) to flow through the first or lap portion 144 of the airbag 136 through the edge portions 180 and 182 of the airbag and through the webbing slot 204 in the tongue 116 member (FIGS. 24-27) into the second or chest portion 150 (FIG. 22) of the airbag 136 upon activation of the source of inflation fluid 130.

Figure 27:
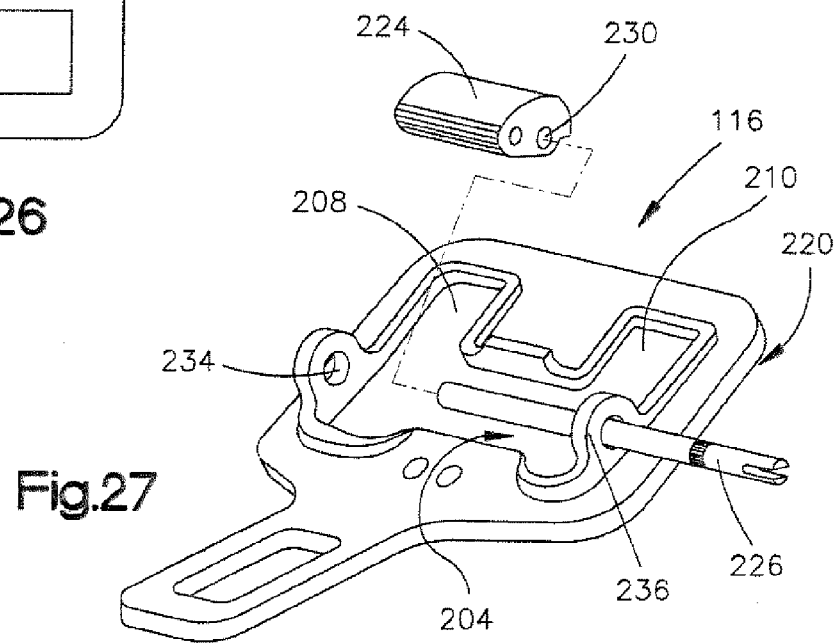
FIG. 27 is partially exploded schematic illustration further depicting the construction of a tongue used with a seat belt containing an inflatable airbag.

One particular tongue 116 which allows inflation fluid to flow from the lap portion 144 through the tongue into the chest portion 150 of the airbag 136 is illustrated in FIG. 27. However, it should be understood that the tongue may have a different construction if desired. For example, the locking cam 224 may be eliminated. This would result in the tongue 116 having a central portion, disposed between the recesses 208 and 210 of FIG. 27, which would engage the central portion of the seat belt 110. The force transmitted through the seat belt would be transmitted to the central portion of the tongue member 116. This would result in a pinching or substantial blocking of flow of inflation fluid through the central portion 176 of the airbag 136. However, the relatively large recesses 208 and 210 would prevent blocking of fluid flow through the edge portions 180 and 182 (FIG. 24) of the airbag 136 even though fluid flow through the central portion 176 of the airbag 136 was substantially blocked by being pulled strongly against the tongue 116. Furthermore, the locking cam 224 may clamp the seat belt to a portion of the base part 220 that does not extend the entire length of the slot 204. Therefore, the locking cam 224 may extend across the entire length of the slot 204 and only clamp the central portion 176 of the airbag 136.

In the embodiment of the invention illustrated in FIGS. 24-27, the tongue member 116 clamps the central portion of the seat belt 110 and blocks a flow of inflation fluid through the central portion 176 of the airbag 136 while enabling inflation fluid to flow through the edge portions 180 and 182 of the airbag. In the embodiment of the invention illustrated in FIGS. 28-31, the tongue member clamps the edge portions of the seat belt without clamping against the central portion of the seat belt. This results in inflation fluid flowing through the central portion of the airbag 136 while flow of inflation fluid through edge portions of the airbag is blocked. Since the embodiment of the invention illustrated in FIGS. 28-31 is generally similar to the embodiment of the invention illustrated in FIGS. 24-27, similar numerals will be utilized to designate similar components, the suffix letter "a" being associated with the numerals of FIGS. 28-31 to avoid confusion.

A tongue member 116a (FIG. 28) has locking portions 242 and 244. The locking portions 242 and 244 clamp edge portions 180a and 182a of an airbag 136a. The locking portions 242 and 244 are ineffective to clamp a central portion 176a of the airbag 136a. Therefore, inflation fluid can flow through the central portion 176a of the airbag 136a while the locking portions 242 and 244 of the tongue 116a clamp the edge portions 180a and 182a to block inflation fluid flow through the edge portions.

The relationship between seat belt 110a and the tongue member 116a is illustrated schematically in FIG. 29. The seat belt 110a extends through a webbing slot or opening 204a. Edge portions 192a and 194a of the seat belt 110a are securely gripped or clamped in the manner indicated schematically at 250 and 252 in FIG. 29. A central portion 256 of the seat belt 110a is not gripped or clamped. This enables inflation fluid to flow through the central portion 176a (FIG. 28) of the airbag 136a contained in the seat belt 110a.

The tongue member 116a is illustrated schematically in FIG. 30 and includes a base part 200a having a webbing slot or opening 204a. A central portion of the webbing slot 204a is enlarged or expanded to form a recess 260. The recess 260 enables the central portion 176a (FIG. 28) of the airbag 136a to expand so that inflation fluid can flow through the central portion 176a of the airbag 136a even though inflation fluid flow is blocked through the edge portions 180a and 182a by the locking portions 242 and 244 of the tongue 116a.

One embodiment of the tongue 116a is illustrated schematically in FIG. 31. This tongue 116a includes a base part 220a having a webbing slot or opening 204a. The webbing slot 204a includes a recess 260 which accommodates expansion of the central portion 176a of the airbag 136a under the influence of inflation fluid pressure.

A cover, corresponding to the cover 18 of FIG. 16, is directly molded onto and partially over the base part 220a. A pair of locking cams 266 and 268 are pivotally mounted on base part 220a by a pivot shaft 226a. The locking cam 266 is fixedly connected to the pivot shaft 226a and is disposed adjacent to a flange 234a. Similarly, the locking cam 268 is fixedly connected to the pivot shaft 226a and is disposed adjacent to a flange 236a. The flanges 234a and 236a support the pivot shaft 226a and locking cams 266 and 268 for pivotal movement relative to the base part 220a. The locking cams 266 and 268 are movable from a release position, corresponding to the position illustrated in FIG. 17 for the locking cam 20, to an engaged locking position, corresponding to the positions illustrated in FIGS. 18 and 19 for the locking cam 20. Although the locking cams It should be understood that the locking cam 266 grips the seat belt 110a at the edge portion 192a of the seat belt. Similarly, the locking cam 268 grips the seat belt 110a adjacent to the edge portion 194a. The space between the two locking cams 266 and 268 extends across the central portion 256 of the seat belt 110a. Although the pivot shaft 226a is shown as mounting both locking cams 266 and 268 to the base part 220a, it is contemplated that each locking cam may be mounted to the base part by a pivot shaft so that the pivot shafts are spaced from each other.

When the seat belt 110a is to restrain an occupant of a vehicle, the inflation fluid source 130 (FIG. 21) is activated.

Inflation fluid 138 (FIG. 22) from the source 130 flows into the lap portion 144 of the airbag 136 (FIG. 22). The inflation fluid flows from the lap portion 144 through the tongue member 116a into the chest portion 150 of the airbag 136.

The flow of inflation fluid through the tongue member 116a is conducted by the central portion 176a of the airbag. The central portion 176a of the airbag 136a is not clamped by the locking cams 266 and 268. However, the edge portions 180a and 182a (FIG. 28) of the airbag 136 are clamped by the locking cams 266 and 268. Therefore, a flow of inflation fluid through the edge portions 180a and 182a of the airbag 136a is blocked or at least substantially retarded while the inflation fluid can flow through the central portion 176a of the airbag. This enables inflation fluid to flow from the lap portion 144 of the airbag 136 through the tongue 116a to the chest portion 150 of the airbag.

Figure 33:
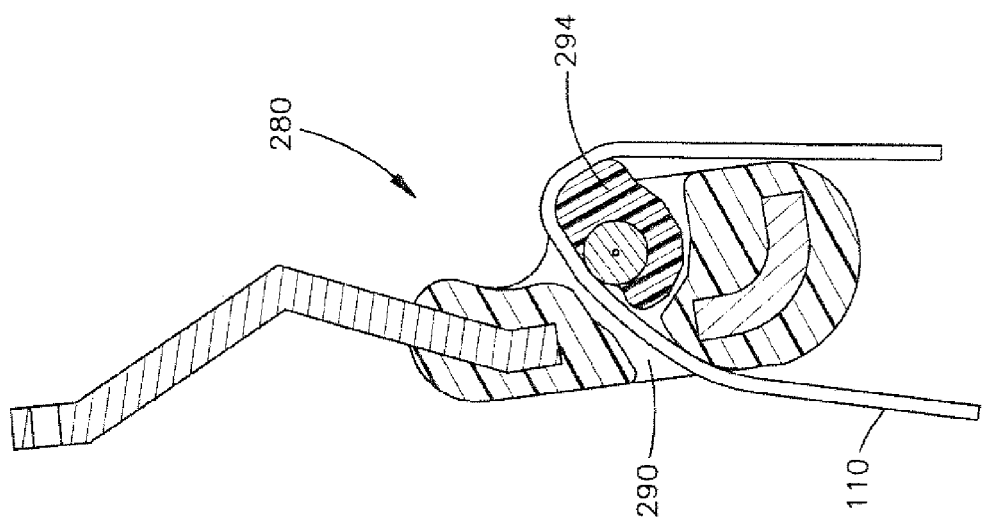
FIG. 33 is a fragmentary sectional view further illustrating the construction of the D-Ring of FIG. 32.
Figure 32:
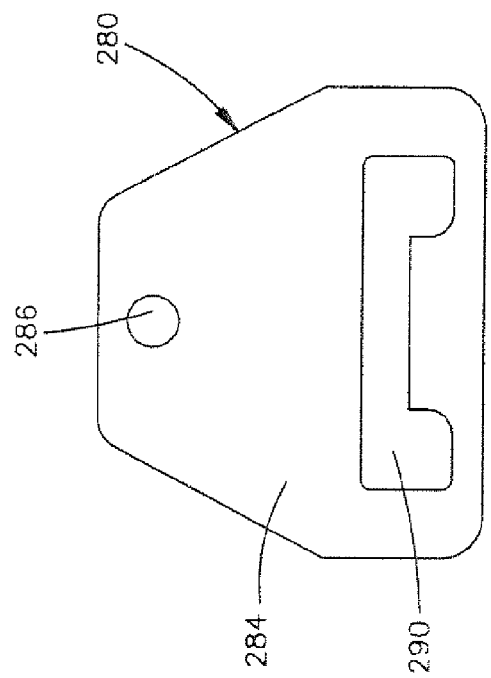
FIG. 32 is a schematic illustration of a portion of a D-ring utilized with an inflatable seat belt containing the airbag of FIG. 22.

Tongue members 116 and 116a which are utilized in the seat belt system 100 of FIG. 21 have been illustrated schematically in FIGS. 24-31. A D-ring member which may be used in the seat belt system 100 is illustrated in FIGS. 32 and 33. The D-ring (FIGS. 32 and 33) has a construction which is similar to the construction of the tongue illustrated in FIGS. 4-6. However, the D-ring of FIGS. 32 and 33 is constructed so as to enable inflation fluid to flow through the portion of the airbag which extends around the D-ring.

A D-ring member 280 constructed in accordance with the present invention is illustrated in FIGS. 32 and 33. The D-ring 280 includes a base part 284 having an opening 286 through which a suitable fastener such as a bolt extends. The bolt attaches the D-ring 280 to the vehicle 104 in a known manner.

The base part 284 of the D-ring member 280 has a webbing slot or opening 290 through which the seat belt 110 (FIGS. 21 and 33) extends. The D-ring 280 has a locking portion, corresponding to the locking portion 174 of FIG. 24, which is effective to apply a clamping force against the central portion of the inflatable seat belt 110. The locking portion is ineffective to provide a clamping force against edge portions, corresponding to the edge portions 192 and 194 of FIG. 25 of the seat belt 110. The locking portion corresponds to the locking portion 174 of FIG. 24.

The D-ring member 280 applies force which is transmitted to the central portion 176 of the airbag 136 in the seat belt 110 (FIGS. 24 and 25). However, the locking portion of the D-ring 280 is ineffective to apply a clamping force which is transmitted to the edge portions 180 and 182 of the airbag 136 (FIG. 24). Therefore, inflation fluid can flow through the edge portions of an airbag 136 in an inflatable seat belt 110 which extends through the webbing slot 290 (FIG. 32) in the D-ring 280.

A locking cam 294 (FIG. 33) extends partway across the webbing slot 290 in the D-ring member 280. The locking cam 294 is effective to apply a clamping force against a central portion 256 of a seat belt 110 to enable the D-ring 280 to lock the seat belt against movement relative to the D-ring and the vehicle 104. A specific embodiment of the D-ring 280 illustrated in FIG. 33 has a construction which is similar to the construction of the seat belt tongue illustrated in FIGS. 4-6.

Although the D-ring member 280 is described as only applying a clamping force against a central portion of the seat belt 110, it is contemplated that the D-ring member may only apply a clamping force against the longitudinally extending edge portions 192 and 194 of the seat belt, similar to the tongue member 116a of FIGS. 28-31. Therefore, the D-ring 280 may be effective to apply a clamping force against the edge portions 192 and 194 and be ineffective to provide a clamping force against the central portion of the seat belt 110.

From the above description of the invention, those skilled in the art will perceive improvements, changes and modifications. Such improvements, changes and modifications within the skill of the art are intended to be covered by the appended claims.

Having described the invention, the following is claimed:

1. A seat belt system for restraining movement of an occupant of a vehicle, said seat belt system comprising:
 a seat belt,
 a member having an opening through which the seat belt extends, the member including a locking portion that applies a force against at least one of a central portion and a longitudinally extending edge portion of the seat belt while being ineffective to apply force to another of the central portion and the longitudinally extending edge portion,
 a first inflatable portion of the seat belt extending in a first direction from the member,
 a second inflatable portion of the seat belt extending in a second direction from the member,
 a source of inflation fluid connected in fluid communication with one of the first and second inflatable portions of the seat belt and connected in fluid communication with another of the first and second inflatable portions of the seat belt through the member and the one inflatable portion of the seat belt enabling inflation fluid to flow from the source of inflation fluid into the one inflatable portion of the seat belt and to flow from the one inflatable portion of the seat belt through the member into the another inflatable portion of the seat belt.

2. A seat belt system as set forth in claim 1 wherein the member is a tongue adapted to engage a buckle.

3. A seat belt system as set forth in claim 1 wherein the member is a D-ring adapted to be mounted on a vehicle.

4. A seat belt system as set forth in claim 1 wherein the locking portion of the member applies force against the central portion of the seat belt and is ineffective to apply force against the longitudinally extending edge portions of the seat belt to permit inflation fluid to flow through the longitudinally extending edge portions of the seat belt.

5. A seat belt system as set forth in claim 1 wherein the locking portion of the member applies a force against longitudinally extending edge portions of the seat belt and is ineffective to apply force against the central portion of the seat belt to permit inflation fluid to flow through the central portion of the seat belt.

6. A seat belt system as set forth in claim 1 wherein the member includes a base and a locking cam movable relative to the base, the locking cam applying a force to clamp the seat belt to the base.

7. A seat belt system as set forth in claim 6 wherein the locking cam only clamps the central portion of the seat belt to the base and is ineffective to clamp the longitudinally extending edge portions of the seat belt to permit inflation fluid to flow through the longitudinally extending edge portions of the seat belt.

8. A seat belt system as set forth in claim 7 wherein the locking cam has an axial length shorter than a width of the seat belt.

9. A seat belt system as set forth in claim 6 wherein the locking cam only clamps the longitudinally extending edge portions of the seat belt to the base and is ineffective to clamp the central portion of the seat belt to the base to permit inflation fluid to flow through the central portion of the seat belt.

10. A seat belt system as set forth in claim 9 wherein the locking cam includes first and second locking cams spaced from each other.

11. A seat belt system as set forth in claim 1 wherein the opening includes a recess which accommodates expansion of the seat belt.

12. A seat belt system as set forth in claim 11 wherein the opening includes first and second recesses spaced apart which accommodate expansion of the longitudinally extending edge portions of the seat belt.

13. A seat belt system as set forth in claim 11 wherein the recess is adjacent a central portion of the seat belt to accommodate expansion of the central portion of the seat belt.

14. A seat belt system as set forth in claim 1 wherein the locking portion prevents relative movement between the seat belt and the member when the locking portion applies the force against the at least one of the central portion and the longitudinally extending edge portion of the seat belt and permits relative movement between the seat belt and the member when the locking portion does not apply the force against the at least one of the central portion and the longitudinally extending edge portion of the seat belt.

15. A seat belt system as set forth in claim 1 wherein the locking portion permits inflation fluid to flow from the one of the first and second inflatable portions of the seat belt through the member and to the other of the first and second inflatable portions of the seat belt when the locking portion applies the force against the at least one of the central portion and the longitudinally extending edge portion of the seat belt.

16. A seat belt system as set forth in claim 1 wherein the source of inflation fluid is connected in direct fluid communication with only the one of the first and second inflatable portions of the seat belt, the one of the first and second inflatable portions directing inflation fluid from the source of inflation fluid to the other of the first and second inflatable portions of the seat belt and through the member.

\* \* \* \* \*